(12) United States Patent
Koegel

(10) Patent No.: US 7,512,668 B2
(45) Date of Patent: Mar. 31, 2009

(54) MESSAGE-ORIENTED MIDDLEWARE SERVER INSTANCE FAILOVER

(75) Inventor: Michael Koegel, Roemerberg (DE)

(73) Assignee: SAP AG, Walldorf (DE)

( * ) Notice: Subject to any disclaimer, the term of this patent is extended or adjusted under 35 U.S.C. 154(b) by 881 days.

(21) Appl. No.: 10/829,874

(22) Filed: Apr. 21, 2004

(65) Prior Publication Data

US 2005/0240667 A1 Oct. 27, 2005

(51) Int. Cl.
G06F 15/16 (2006.01)
(52) U.S. Cl. .................. 709/217; 709/219; 709/220; 714/4; 714/5; 707/1
(58) Field of Classification Search .......... 709/217, 709/219, 220; 714/4, 5; 707/1
See application file for complete search history.

(56) References Cited

U.S. PATENT DOCUMENTS

| | | | | |
|---|---|---|---|---|
| 6,751,657 B1 * | 6/2004 | Zothner | ................. | 709/220 |
| 6,877,107 B2 * | 4/2005 | Giotta et al. | ................. | 714/4 |
| 7,177,917 B2 * | 2/2007 | Giotta | ................. | 709/219 |
| 2002/0087507 A1 * | 7/2002 | Hopewell et al. | ................. | 707/1 |

* cited by examiner

Primary Examiner—Jinsong Hu
(74) Attorney, Agent, or Firm—Blakely, Sokoloff, Taylor & Zafman

(57) ABSTRACT

A system and method are provided for failover of a Message-Oriented Middleware (MOM) server instance in an MOM provider having multiple MOM server instances. In an embodiment, a first server node receives notification that an MOM server instance on a second server node is inoperative. The MOM server instance on the second server node may have one or more associated destinations. In an embodiment, the first server node attempts to obtain a lock for at least a portion of MOM server instance configuration information from a locking service. If the lock is obtained, the first server node may acquire the one or more destinations of the inoperative MOM server instance.

14 Claims, 13 Drawing Sheets

MESSAGE-ORIENTED MIDDLEWARE SERVER INSTANCE FAILOVER

TECHNICAL FIELD

Embodiments of the invention generally relate to the field of Message-Oriented Middleware (MOM) and more particularly, to a system and method for MOM server instance failover.

BACKGROUND

Traditional client-server systems employ a two-tiered architecture such as that illustrated in FIG. 1. Applications 102 executed on the client side 100 of the two-tiered architecture are comprised of a monolithic set of program code including a graphical user interface component, presentation logic, business logic and a network interface that enables client 100 to communicate over network 103 with one or more servers 101. A database 104 maintained on server 101 provides non-volatile storage for the data accessed and/or processed by application 102.

As is known in the art, the "business logic" component of the application represents the core of the application, for example, the rules governing the underlying business process (or other functionality) provided by the application. The "presentation logic" describes the specific manner in which the results of the business logic are formatted for display on the user interface. The "database" 104 includes data access logic used by the business logic to store and retrieve data.

The limitations of the two-tiered architecture illustrated in FIG. 1 become apparent when employed within a large enterprise. For example, installing and maintaining up-to-date client-side applications on a large number of different clients is a difficult task, even with the assistance of automated administration tools. Moreover, a tight coupling of business logic, presentation logic and the user interface logic makes the client-side code very brittle. Changing the client-side user interface of such applications is extremely hard without breaking the business logic, and vice versa. This problem is aggravated by the fact that, in a dynamic enterprise environment, the business logic may be changed frequently in response to changing business rules. Accordingly, the two-tiered architecture is an inefficient solution for enterprise systems.

In response to limitations associated with the two-tiered client-server architecture, a multi-tiered architecture has been developed, as illustrated in FIG. 2. In the multi-tiered system, presentation logic 221, business logic 222 and database 223 are logically separated from the user interface 220. These layers are moved off of client 225 to one or more dedicated servers on network 203. For example, presentation logic 221, business logic 222, and database 223 may each be maintained on separate servers, 226, 227 and 228, respectively.

This separation of logic components and the user interface provides a more flexible and scalable architecture compared to that provided by the two-tier model. For example, the separation ensures that all clients 225 share a single implementation of business logic 222. If business rules change, changing the current implementation of business logic 222 to a new version may not require updating any client-side program code. In addition, presentation logic 221 may be provided which generates code for a variety of different user interfaces 220, which may be standard browsers such as Internet Explorer® or Netscape Navigator®.

Although the multi-tiered system illustrated in FIG. 2 provides a more flexible architecture, it also results in significant additional complexity. For example, the distributed nature of applications and components within the multi-tiered system makes it more complicated for the applications and components to communicate with each other. A class of middleware known as Message-Oriented Middleware may be used to facilitate communication between applications and components.

Message-Oriented Middleware (MOM) refers to computer software that provides a message service between software components or applications. The message service provided by MOM is often referred to as "loosely coupled" because a component sends a message to a destination and the recipient can retrieve the message from the destination. A message service typically includes a message provider and one or more clients. The message provider facilitates, for example, creating, sending, receiving, and reading messages. A client uses the message provider to, for example, send a message to a destination and another client may use the message provider to retrieve the message from the destination.

Although the message service facilitates communication between distributed software components and applications, it also reduces some of the flexibility of the multi-tiered architecture. For example, the message provider may be implemented on a single node of a multi-tiered network. If the node becomes inoperative, then the entire message service may cease to function. Also, the centralized nature of a message service increases the risk that the entire message service will fail if the central message provider becomes inoperative.

SUMMARY OF THE INVENTION

A system and method are provided for failover of a Message-Oriented Middleware (MOM) server instance in an MOM provider having multiple MOM server instances. In an embodiment, a first server node receives notification that an MOM server instance on a second server node is inoperative. The MOM server instance on the second server node may have one or more associated destinations. In an embodiment, the first server node attempts to obtain a lock for at least a portion of MOM server instance configuration information from a locking service. If the lock is obtained, the first server node may acquire the one or more destinations of the inoperative MOM server instance.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

A system and method are provided for failover of a Message-Oriented Middleware (MOM) server instance in an MOM provider having multiple MOM server instances. In an embodiment, a first server node receives notification that an MOM server instance on a second server node is inoperative. The MOM server instance on the second server node may have one or more associated destinations. In an embodiment, the first server node attempts to obtain a lock for at least a portion of MOM server instance configuration information from a locking service. As is further described below, if the lock is obtained, the first server node may acquire the one or more destinations of the inoperative MOM server instance.

Figure 1:
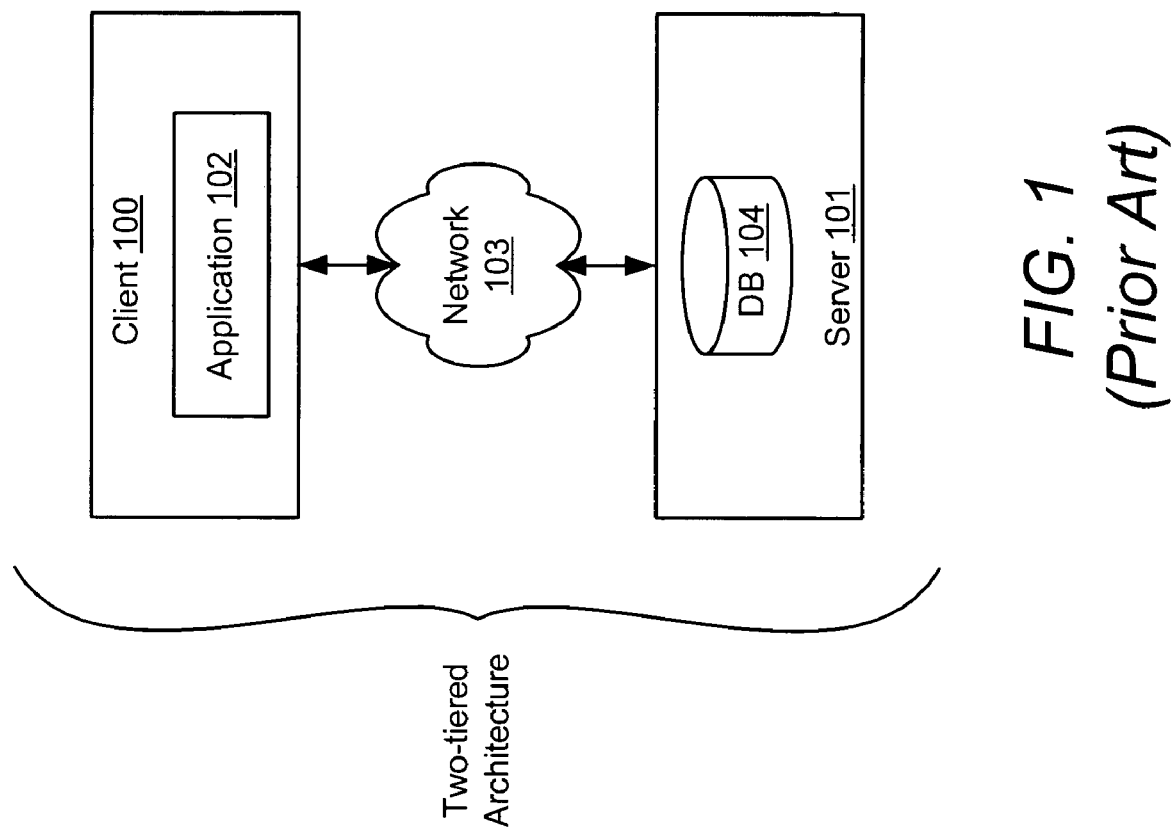
FIG. 1 illustrates a traditional two-tier client-server architecture.
Figure 2:
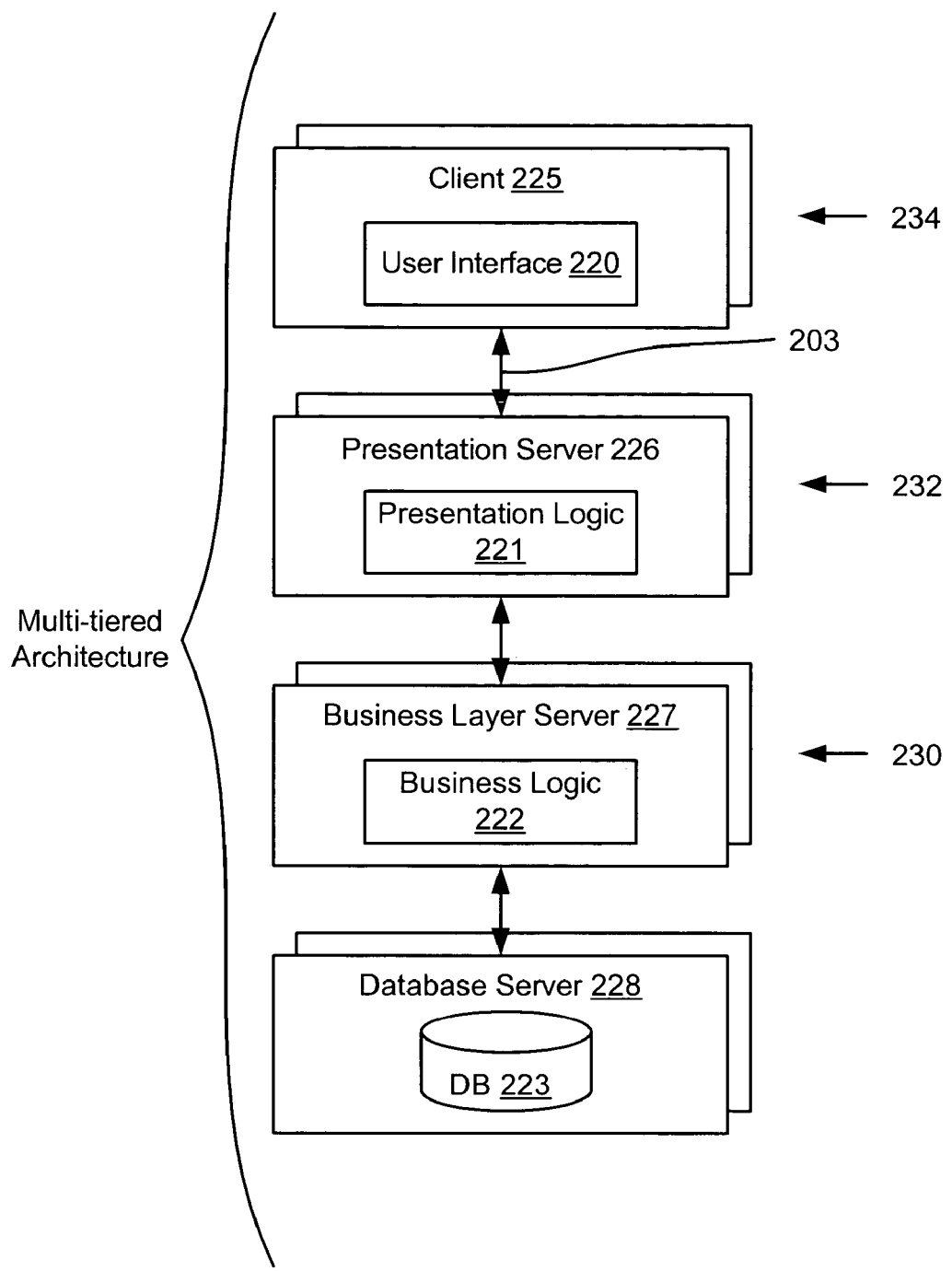
FIG. 2 illustrates a prior art multi-tier client-server architecture.
Figure 3:
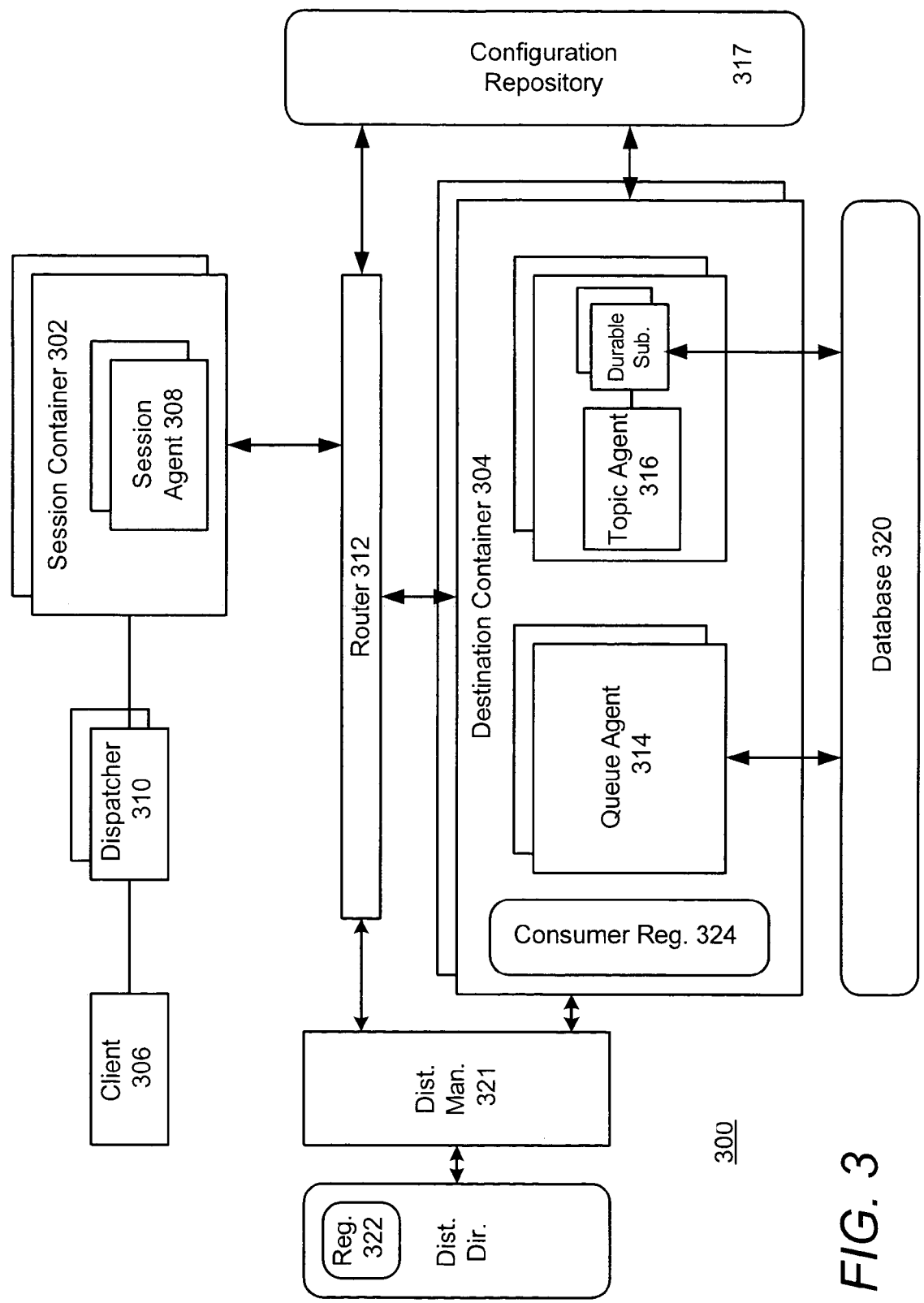
FIG. 3 is a block diagram of a Message-Oriented Middleware (MOM) provider implemented according to an embodiment of the invention.

FIG. 3 is a block diagram of MOM provider 300 implemented according to an embodiment of the invention. As is further discussed below, MOM provider 300 may be integrated into a multi-tiered network (e.g., the multi-tiered network illustrated in FIG. 2). The multi-tiered network may be implemented using a variety of different application technologies at each of the layers of the multi-tier architecture, including those based on the Java 2 Enterprise Edition™ ("J2EE") platform, the Microsoft .NET platform, the Websphere platform developed by IBM Corporation, and/or the Advanced Business Application Programming ("ABAP") platform developed by SAP AG.

Figure 11:
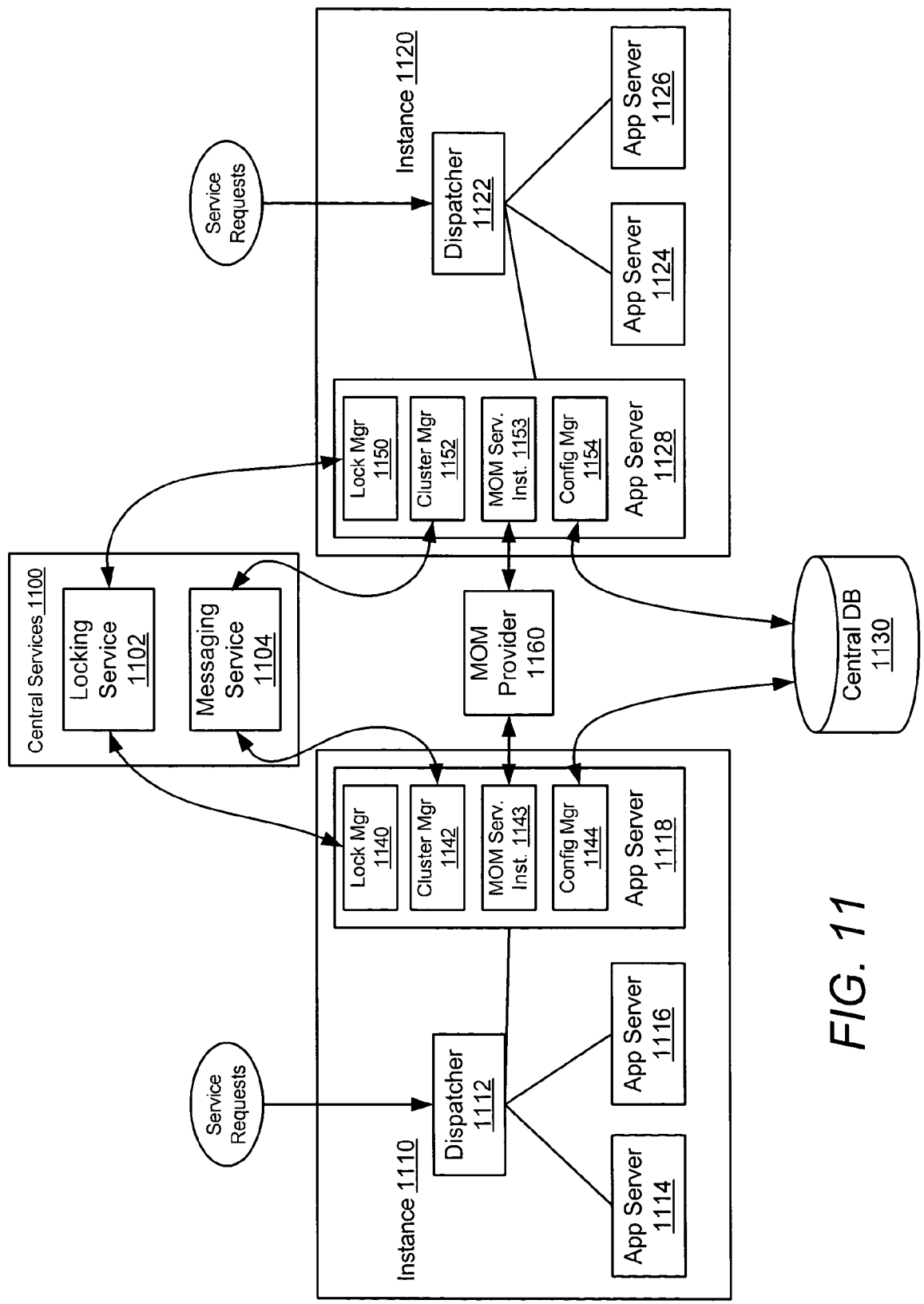
FIG. 11 is a block diagram illustrating an embodiment of an application server architecture.

In an embodiment, MOM provider 300 is implemented in a multi-tiered network having a cluster architecture (e.g., the cluster architecture illustrated in FIG. 11). In such an embodiment, elements of MOM provider 300 may be distributed across multiple application servers. The term "application server" broadly refers to a computing device that performs data processing. In a multi-tiered environment, such as the one illustrated in FIG. 2, application servers may provide the business logic for the distributed system. In an embodiment in which the business logic (e.g., business logic 222, shown in FIG. 2) exchanges information with a user interface (e.g., user interface 220, shown in FIG. 2) via the Internet, the application servers providing the business logic may be described as a Web application servers. The distribution of elements of MOM provider 300 across multiple application servers is further discussed below with reference to FIG. 4-7.

In an embodiment, MOM provider 300 is separated into two main layers: session container 302 and destination container 304. Session container 302 is responsible for session and connection related tasks. The term "session" refers to an active connection between two elements of a distributed system (e.g., between two applications, between two components, between an application and a component, etc.). The term "connection" refers to a connection between an MOM client and the MOM provider.

In an embodiment, when a client creates an MOM connection (e.g., via a directory lookup) the connection is bound to a session container (e.g., session container 302). All sessions created on the connection may also be bound to the session container. In an embodiment, session container 302 may manage the connections and sessions of multiple clients (e.g., client 306).

In one embodiment, session container 302 includes a logical session agent 308 for each session it is managing. Session agent 308 may process (and/or preprocess) all requests for an MOM session using one or more logical handlers. The term "handler" refers to a software routine that performs a particular task. Examples of handlers provided by session agent 308 may include, and are not limited to, security management, logging, monitoring, etc. As is further discussed below with reference to FIG. 4, in an embodiment, each application server may include an instance of session container 302.

In operation, client 306 may send an MOM message to dispatcher 310 to be distributed to a destination. Session container 302 may accept the message and forward it to session agent 308. Session agent 308 may process the message and send it to router 312. Router 312 may be a logical component that transmits messages between session container 302 and destination container 304. Since MOM provider 300 may have a distributed architecture having multiple session containers and multiple destination containers, session container 308 may or may not be implemented on the same application server as destination container 304. Router 312 may include router code and the router code may be implemented on all application servers in the network. Within a given application server, router 312 may use the internal communication system of the application server.

Destination container 304 is responsible for executing the core messaging functions of storing messages (e.g., in volatile memory and/or persistently), maintaining the order of messages, and distributing the messages to the proper recipients. In one embodiment, destination container 304 includes all of the destination agents (e.g., queue agent 314 and topic agent 316) that are bound to the application server on which destination container 304 is implemented. The term "destination agent" refers to a software agent that is responsible for handling the messaging operations of a particular destination. In an embodiment, the destination agents are maintained in volatile memory as data structures for all destinations that are "active." The term "active" may refer to a destination that has at least one consumer or producer attached.

MOM provider 300 may support one (or both) of the messaging schemes known as point-to-point and publish/subscribe messaging. In point-to-point messaging, each message is addressed to a specific queue. The term "queue" refers to a storage space either in memory or a persistent store (e.g., a database) for messages that are addressed to a particular client. A client establishes the queue to hold its messages. The queue may retain all messages sent to it until the messages are consumed or until they are expired.

In a publish/subscribe messaging scheme a client addresses a message to a topic. The term "topic" refers to a storage space either in memory or a persistent store (e.g., a database) for messages that may be accessed by clients that subscribe to the topic. The topic may retain messages for as long as it takes to distribute the messages to all subscribed clients.

In an embodiment, queue agent 314 handles all messages for a particular queue (e.g., a queue in database 320 and/or in volatile memory). In one embodiment, queue agent 314 manages the order of messages within an associated queue. In such an embodiment, a separate queue agent 314 exists for each queue managed by destination container 304.

In an embodiment, topic agent 316 handles all messages sent to an associated topic. In such an embodiment, topic agent 316 includes logic to maintain the associated topic in volatile memory. In addition, topic agent 316 may include memory swapping logic to swap data between volatile memory and, for example, database 320. In an alternative embodiment, topic agent 316 includes logic to maintain the associated topic on database 320 (in addition to or instead of maintaining the topic in volatile memory). In an embodiment in which MOM provider 300 is implemented within a cluster of application servers, there is a distinct instance of topic agent 316 for each topic within the cluster.

In an embodiment, distribution manager 321 maintains information indicating which node (e.g., which application server) runs which sessions and which destinations. In an alternative embodiment (e.g., in which distribution manager 321 is not implemented), dispatcher 310 assigns each client to a particular server node. The information about that node may be stored in a connection that is maintained by the cluster communication system (e.g., messaging service 1104, shown in FIG. 11). In one embodiment, distribution manager 321 also creates agents, as needed, for nodes that use message provider 300. For example, distribution manager 321 may create session agent 308, queue agent 314, and/or topic agent 316, as needed. In an alternative embodiment, destination agents (e.g., queue agent 314 and/or topic agent 316) are created by an appropriate AgentHandler (e.g., handler 422, shown in FIG. 4) for each destination that becomes active. In addition, session contexts may implement the functionality of session agents 308. A SessionHandler (e.g., handler 408, shown in FIG. 4) for each client session may create a session context and the session context may be stored in the corresponding connection context.

In an embodiment, router 312 and distribution manager 321 make use of one or more directories and repositories that store information for MOM provider 300. In an embodiment, destination registry 322 stores the physical location of the agents (e.g., queue agent 314 and/or topic agent 316) responsible for each destination. In an alternative embodiment (e.g., in which destination registry 322 is not implemented), destinations and related objects (e.g., queue agent 314 and/or topic agent 316) that belong to a given MOM server instance (e.g., MOM server instance 400, shown in FIG. 4) are hosted on the same server node (e.g., application server 410, shown in FIG. 4). In such an embodiment, MOM provider 300 may store information about which node is hosting which MOM server instance. Each MOM server instance may provide this information to MOM provider 300 during startup. In an embodiment in which MOM provider 300 is implemented within a cluster, the information stored in destination registry 322 may be available cluster-wide so that all MOM instances may locate the agents. This location information may change during runtime if, for example, a server within a cluster is stopped.

In an embodiment, consumer registry 324 maintains a list of consumers for each destination in destination container 304. In one embodiment, each node within a cluster registers consumers for the destinations that are associated with the destination container that is implemented on the node. In such an embodiment, consumer registry 324 is not replicated to other nodes within the cluster. As is further described below, with reference to FIG. 6, configuration repository 317 may store configuration information for MOM entities such as MOM server instances, queues, topics, durable subscriptions, and the like.

Database 320 may persistently store messages for queues and/or durable subscriptions. The term "durable subscription" refers to receiving messages at a topic for a client that is not active (e.g., not currently connected to the topic). In addition, database 320 may store data that is "swapped" in and out of volatile memory to conserve system resources. In an embodiment, database 320 includes a Database Management System (DBMS). The term "DBMS" refers to logic that provides overall organization of the data within a database. For example, a DBMS may retrieve of the data from the database and/or ensure integrity of the data within the database. In an embodiment, the DBMS may be a "relational" DBMS (or simply, RDBMS).

Figure 4:
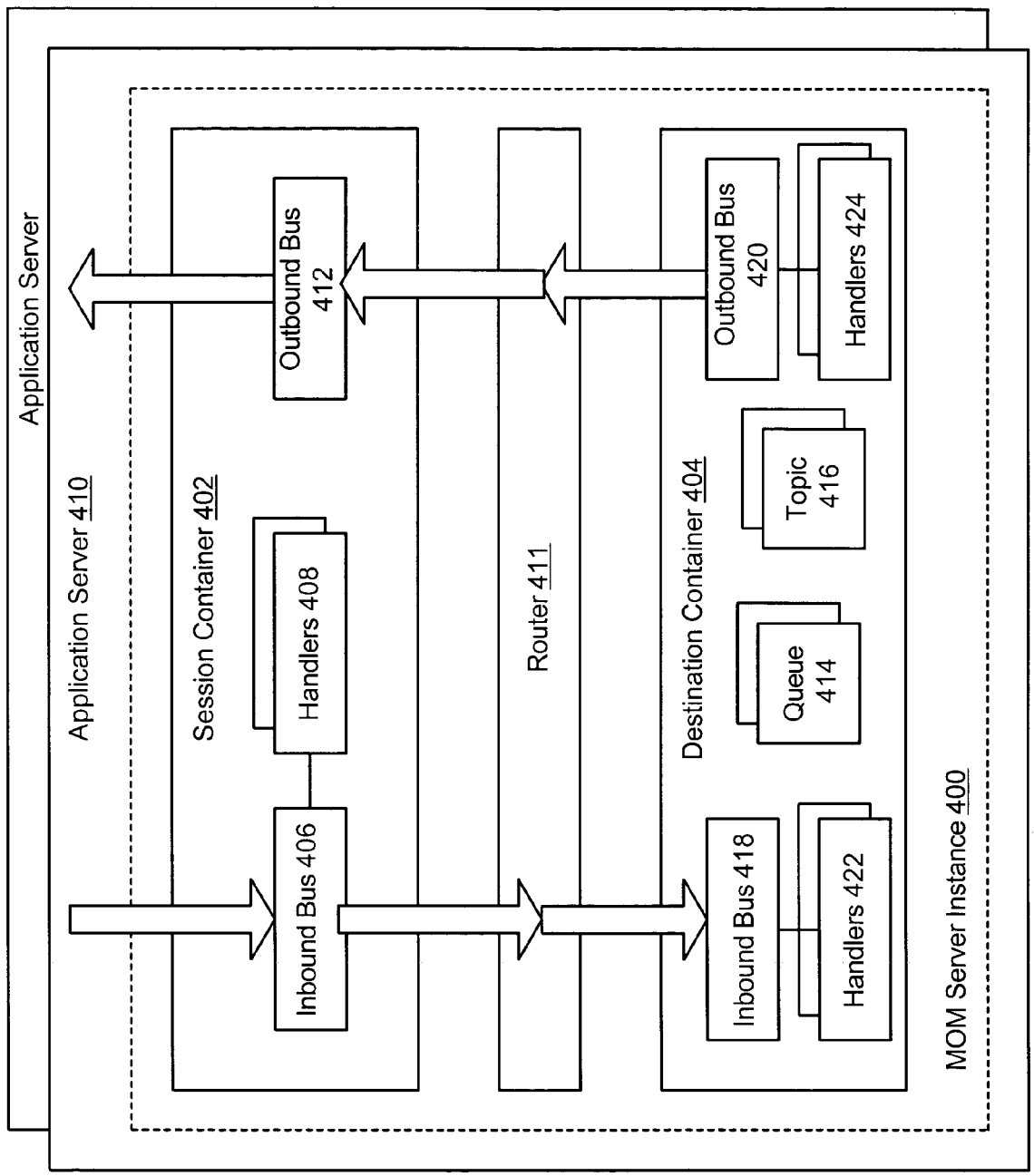
FIG. 4 is a block diagram of selected elements of an MOM server instance, implemented according to an embodiment of the invention.

FIG. 4 is a block diagram of selected elements of MOM server instance 400, implemented according to an embodiment of the invention. In an embodiment, an MOM provider (e.g., MOM provider 300, shown in FIG. 3) is distributed into multiple server instances (e.g., multiple instances of MOM server instance 400). Each of the multiple server instances may be implemented on a separate application server (e.g., application server 410). As is further discussed below, implementing distinct MOM server instances on each application server provides a highly scalable MOM architecture for enterprise networks.

In one embodiment, application server 410 is a Java 2 Enterprise Edition (J2EE) application server. The term J2EE application server broadly refers to an application server that implements, at least in part, one of the J2EE specifications, for example, v1.3, published on Jul. 27, 2001 (hereinafter the J2EE Standard). Examples of a J2EE application server may include, for example, the Web Application Server (Web AS) provided by SAP AG and the Websphere application server by IBM Corporation. In an alternative embodiment, application server 410 is implemented according to a different platform, for example, the Microsoft NET platform.

In an embodiment, MOM server instance 400 is a Java Message Service (JMS) based MOM server instance. A JMS-based server instance broadly refers to an MOM server instance that implements, at least in part, the JMS Application Program Interface (API). In an alternative embodiment, MOM server instance 400 may be based on a different messaging API.

MOM server instance 400 may include session container 402 and destination container 404. In an embodiment in which multiple server instances are implemented on separate application servers (or simply, separate nodes), each server instance may be "visible" to all of the nodes. For example, each server instance 400 may register with a distribution directory (e.g., distribution directory 522, shown in FIG. 5). During runtime, the MOM provider (e.g., MOM provider 300, shown in FIG. 3) may locate the agents and destinations of MOM server instance 400 with the information stored in, for example, the distribution directory. In one embodiment, each MOM server instance 400 is separately started on every node.

Session container 402 manages one or more messaging sessions. Incoming messages (e.g., messages sent from a client) arrive on inbound bus 406. Inbound bus 406 may be a data structure holding one or more incoming messages. Handlers 408 may be software routines that process (or preprocess) incoming messages. Handlers 408 may include session handlers, acknowledge handlers, queue browser handlers, connection handlers, and the like. Inbound bus 406 may pass incoming messages to router 411 (or to destination container 404). In the illustrated embodiment, outbound bus 412 does not include any handlers. In such an embodiment, outbound bus 412 may receive outgoing messages from router 411 and pass them to a dispatcher (e.g., dispatcher 310, shown in FIG. 3) for distribution to a client.

Router 411 receives incoming messages from a session container (e.g., session container 402) and distributes them to the proper destination container (e.g., distribution container 404). In one embodiment, router 411 is an implementation of router logic executing on application server 410. Router 411 also receives messages from a destination container (e.g., distribution container 404) and passes them to the proper session container (e.g., session container 402). In one embodiment, router 411 handles both local and remote connections.

Destination container 404 manages one or more destinations. The destinations managed by destination container 404 may include queues (e.g., queue 414) and/or topics (e.g., topic 416). In one embodiment, the destinations managed by a destination container only reside on the node on which the destination is implemented. For example, in an embodiment, queue 414 and topic 416 only reside on application server 410.

Inbound bus 418 and outbound bus 420 may be data structures that respectively hold incoming and outgoing messages. Handler 422 may be one or more software routines that process incoming messages. Similarly, handler 424 may be one or more software routines that process outgoing messages. Examples of handler 422 and 424 include, and are not limited to, acknowledge handlers, agent handlers, JMS message handlers, recover handlers, subscription handlers, and the like.

The following is a description of an embodiment of the invention having two MOM server instances distributed over two application servers to support two applications. The number of MOM server instances, application servers, and supported applications are selected merely for the purposes of explanation. In an alternative embodiment, there may be a different number of each of the illustrated elements.

Figure 5:
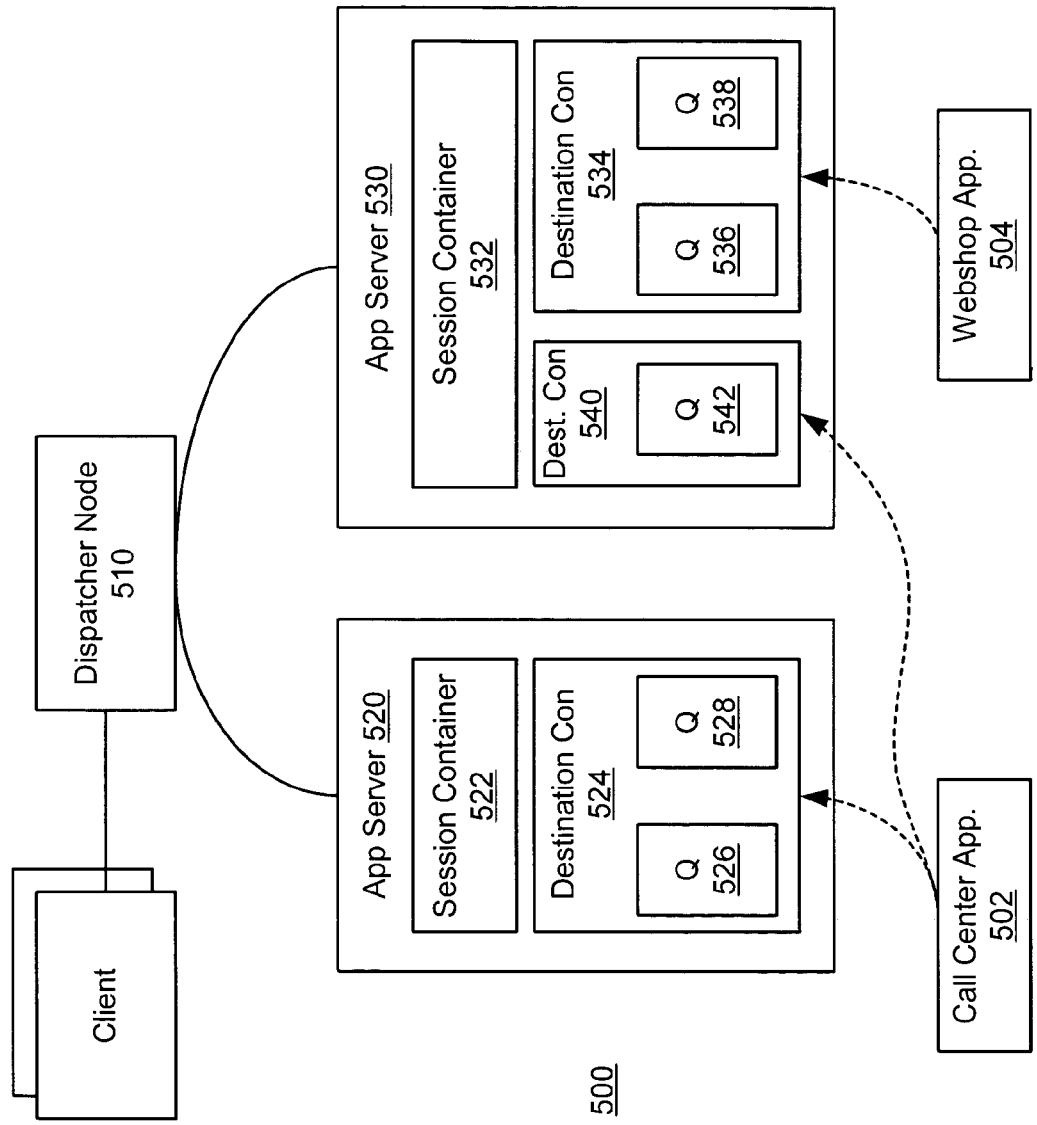
FIG. 5 is a block diagram of selected elements of a distributed system implemented according to an embodiment of the invention.

FIG. 5 is a block diagram of selected elements of distributed system 500 implemented according to an embodiment of the invention. In the illustrated embodiment, application 502 is deployed to application server 520 and application 504 is deployed to application server 530. Application 502 may be, for example, a call center application and application 504 may be a "Webshop" application. The term "Webshop" refers to buying and selling goods over the Internet.

An MOM provider may be configured to provide optimal performance in distributed system 500. For example, the MOM provider may be configured to provide session container 522 on application server 520 and session container 532 on application server 530. In an embodiment, session containers 522 and 532 are responsible for managing user sessions (e.g., managing transactional operations such as rollbacks). Dispatcher node 510 may distribute the load produced by these user sessions over both application server 520 and application server 530.

The MOM provider may also be configured to provide destination containers 524, 534, and 540. As illustrated in FIG. 5, destination containers 524, 534, and 540 may be configured to, for example, distribute the messaging load over two or more application servers and/or separate the namespaces for the destinations that are contained within the destination containers. For example, application 502 may have queues 526, 528, and 542. Destination container 524, implemented on application server 520, may be configured to provide queues 526 and 528. Similarly, destination container 540 may be configured to provide queue 542 on application server 530. Since the queues for application 502 are distributed over two different application servers, the messaging load generated by application 502 is likewise distributed over application server 520 and 530.

In the illustrated embodiment, a separate logical MOM server instance may be configured to support application 504. For example, destination container 534 may be configured to provide two queues for application 504: queue 536 and queue 538. In one embodiment, the namespace for queues 536 and 538 is separated from the namespace for queues 526, 528, and 542 because the queues are implemented in separate logical MOM server instances. For example, queue 536 may have the same name as queue 526. Since messages are routed to the queues through separate logical MOM server instances, however, there is no conflict generated by the fact that they share the same name.

In some embodiments of the invention, queues 526, 528, and 542 may be at least partly based on the Java Message Services (JMS) API. In such embodiments, certain quality-of-service requirements may be enforced. For example, exactly-once delivery for each message may be maintained and/or the proper sequencing of messages may be enforced. In one embodiment, a distribution manager (e.g., distribution manager 321, shown in FIG. 3) may regulate these quality-of-service requirements. For example, the distribution manager may start each queue on only one application server in order to ensure that there is one unique transient representation of the queue.

In alternative embodiments, other (e.g., weaker) quality-of-service characteristics may be configured for each queue. These alternative quality-of-service characteristics may be configured, for example, to maximize message throughput. The term "cluster mode" refers to the quality-of-service provided by a given queue. In one embodiment, three cluster modes are available: global queues, local queues, and store-and-forward queues.

In an embodiment, a "global queue" is a queue for which there is only one unique in-memory representation throughout an application server cluster. Global queues are assigned to one particular destination container. If a message for a global queue is processed by a session container running on a different application server (or simply, node) than the node hosting the global queue, the message is immediately (e.g., synchronously) forwarded through the cluster messaging system (e.g., via router 312, shown in FIG. 3) to the node hosting the global queue.

In an embodiment, a "local queue" is a queue for which there is a separate instance of the queue running on each application server. Messages for a local queue are only consumed by clients (and services) running on the node that is hosting the local queue. Local queues may provide asynchronous decoupling of operations in environments in which load balancing and message sequencing are not emphasized.

Like a global queue, a "store-and-forward" queue has only one unique in-memory representation throughout an application server cluster. Unlike a global queue, however, a message for a store-and-forward queue is not synchronously forwarded from a session container running on a remote node to the node hosting the store-and-forward queue. Instead, the message may be buffered at the remote node for a period of time and then forwarded to the node hosting the store-andforward queue. In one embodiment, the message may be buffered at the remote node based, at least in part, on load balancing considerations.

Figure 6:
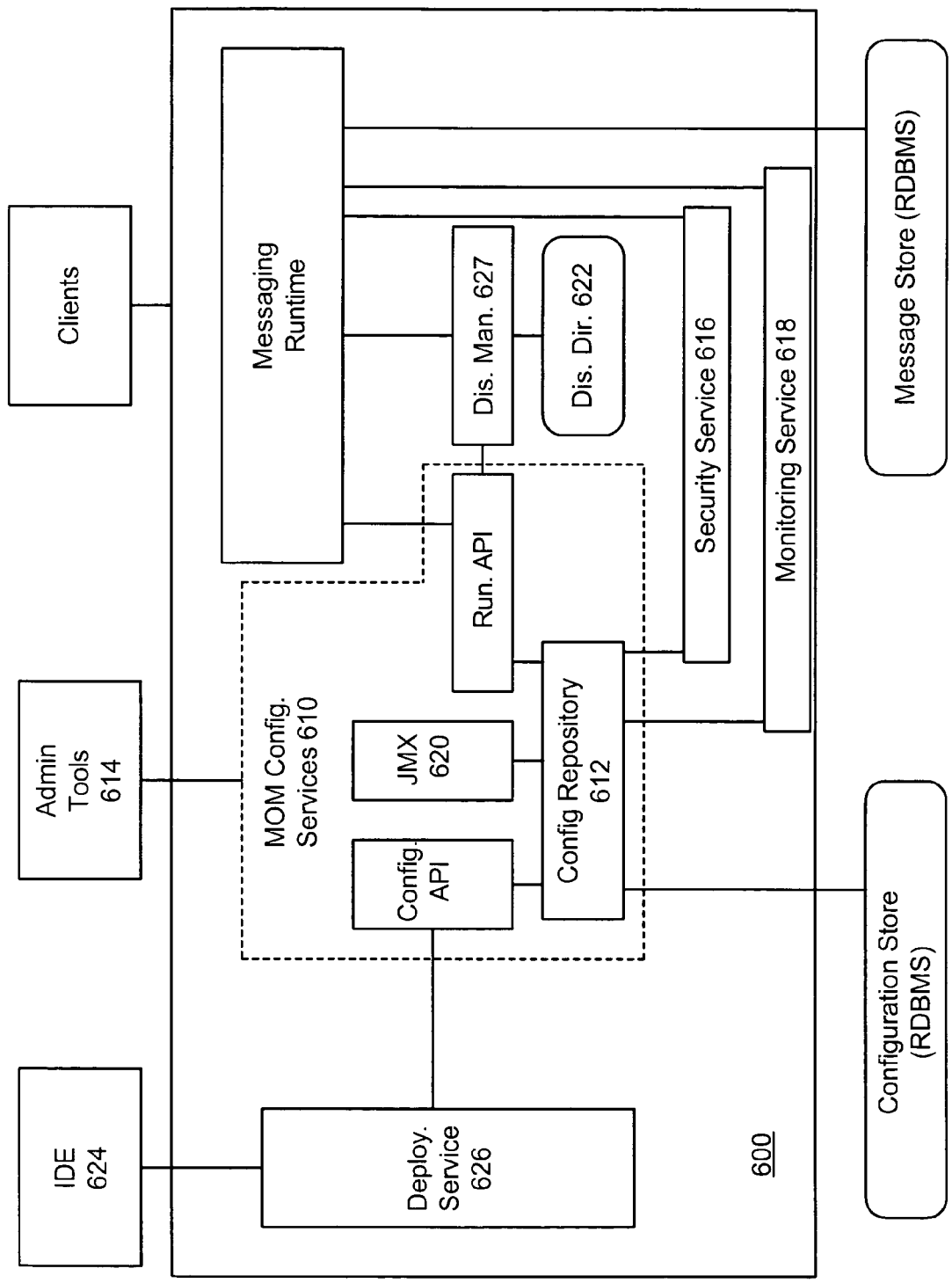
FIG. 6 is a block diagram of selected elements of the "configuration facilities" for an MOM provider, according to an embodiment of the invention.

In an embodiment, an MOM server instance (e.g., MOM server instance 400) may be separately configured for each node in a distributed network. The configuration information established for each MOM server instance may be used to distribute and process messages (e.g., the configuration information may be used to identify a "name" of a server instance). FIG. 6 is a block diagram of selected elements of configuration facilities 600 for an MOM provider, according to an embodiment of the invention.

MOM configuration services 610 may provide access to configuration information for a deploy service (e.g., deploy service 626) and/or an administrative tool (e.g., administrative tool 614). Integrated development environment (IDE) 624 may use deploy service 626 to define the settings (e.g., define configuration information) for one or more MOM server instances during the deployment of application code. For example, in some cases it is desirable to configure one or more services (e.g., an MOM service) in conjunction with deploying application code. In an embodiment, one or more configuration settings of an MOM server instance may be specified in the IDE (e.g., in an eXtensible Markup Language file) and deployed with the application code. In an embodiment, deploy service 626 may be an implementation, at least in part, of the J2EE deploy service.

In an embodiment, administrative tool 614 accesses configuration services 610 to inspect and modify configuration information. Administrative tool 614 may include a graphical user interface (GUI) and/or may be a shell console (e.g., command line driven interface). In an embodiment, administrative tool 614 is a Web-based administrative tool. In an embodiment, in which administrative tool 614 provides a GUI, the GUI may be a swing-based GUI. A Swing-based GUT refers to a GUI that is based on the Swing API provided by, for example, the Java 2 Platform, Standard Edition, Specification, 1.4.2, Nov. 20, 2003.

MOM configuration services 610 includes configuration repository 612. Configuration repository 612 may store configuration information for MOM entities such as MOM server instances, queues, topics, durable subscriptions, and the like. Configuration information for these entities is further described below with reference to FIGS. 7a-7b. In an embodiment, MOM configuration services 610 may provide the information stored in repository 612 to, for example, distribution manager 627, security service 616, and/or monitoring service 618. In an embodiment, monitoring service 618 is, at least partly, based on the Java Management eXtensions (JMX) standard. The term "JMX standard" may refer to, for example, JSR-000003, entitled, "Java Management eXtensions (JMX), version 1.2." In such an embodiment, JMX bridge 620 may provide access to one or more manageable resources (e.g., configuration information) stored in configuration repository 612.

In an embodiment, distribution manager 627 distributes handlers (e.g., handlers 422 and/or 424, shown in FIG. 4) for MOM destinations that are separately implemented on a number of distinct nodes. In addition distribution manager 627 may create new instances of handlers, monitor the operational state of handlers, and/or migrate the handlers from one node to another as needed (e.g., during failover). Distribution manager 627 stores information about handlers, sessions, destinations, and/or agents in distribution directory 622.

In one embodiment, distribution directory 622 stores the runtime-dependent location of the various agents that are used by the MOM server instances that are separately implemented on two or more nodes of a distributed network (e.g., a J2EE cluster). To provide timely access, the information of distribution directory 622 may be stored in the volatile memory of one or more network nodes (e.g., each J2EE cluster node).

In an embodiment, an MOM provider having multiple MOM server instances is, at least partly, integrated with a JMS-based API. For ease of discussion, an embodiment of the invention that is integrated with a JMS-based API is described with reference to FIGS. 7a and 7b. In such an embodiment, the MOM provider and MOM server instances may be, respectively, referred to as the JMS provider and JMS server instances. It is to be understood, however, that the concept of an MOM provider having multiple MOM server instances is not limited to embodiments that are integrated with the JMS API.

The JMS-based API defines pre-configured objects known as "administered objects" which implement some of the functions of a JMS-based message service. The administered objects include "connection factories" and "destinations." A "connection factory" is a pre-configured JMS object that a client uses to create a connection with a JMS provider. A "destination" is an object that a client uses to specify as the target for the messages it produces and/or the source of the messages it consumes. These administered objects may be stored in the Java Naming Directory Interface (JNDI) API namespace of a node.

Figure 7A:
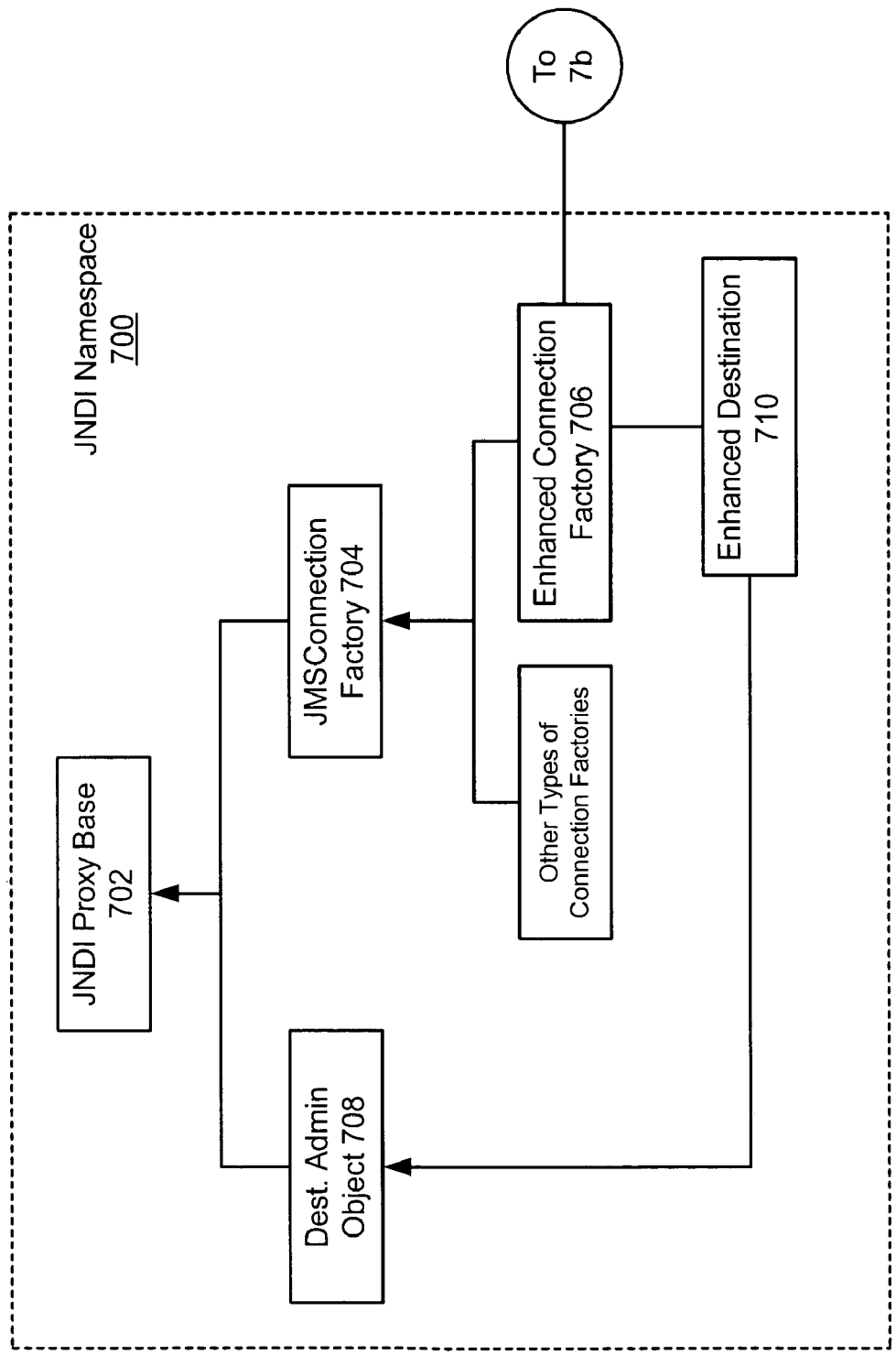
FIG. 7a is a conceptual illustration of the administered objects stored in a registry service, according to an embodiment of the invention.
Figure 7B:
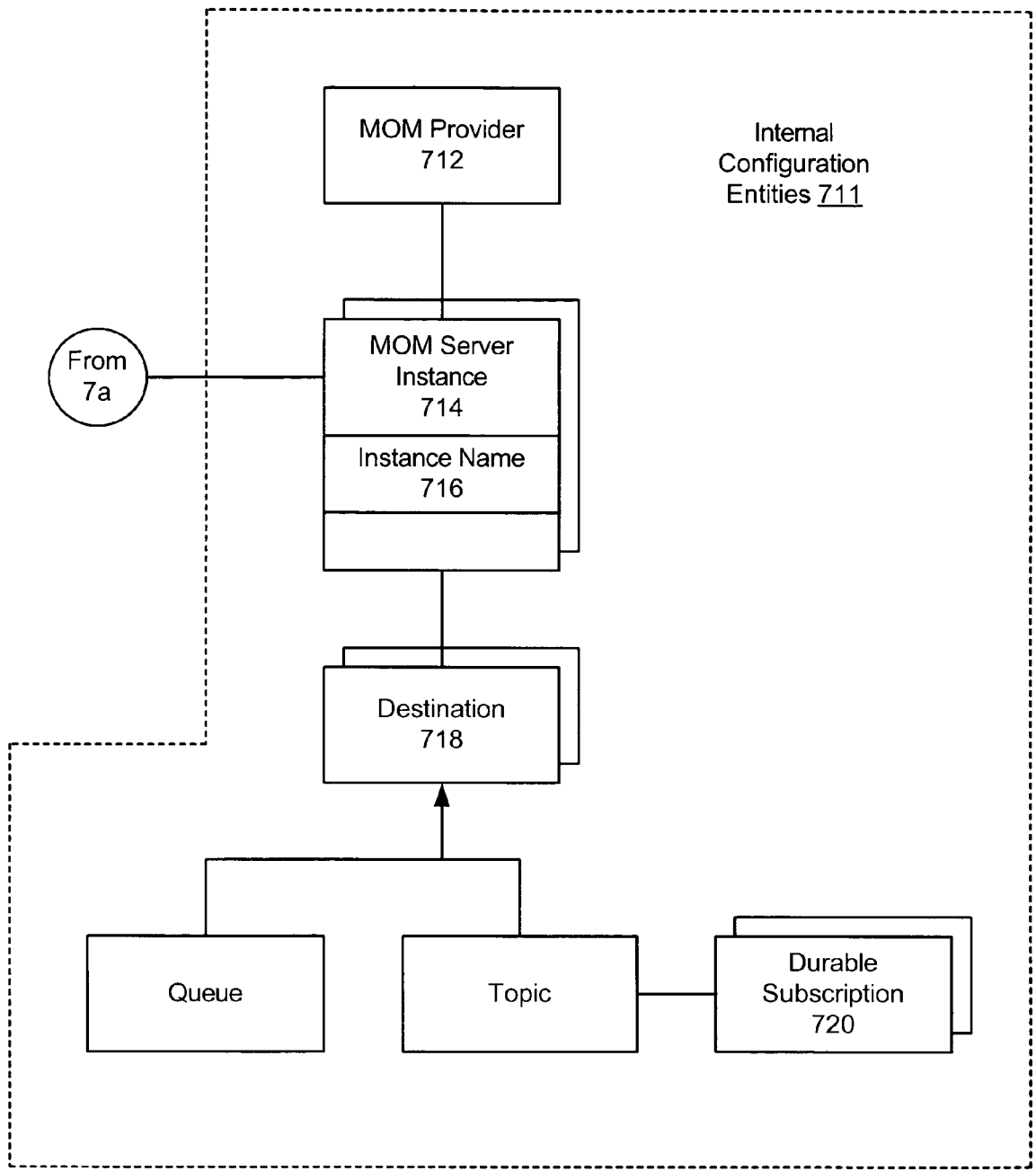
FIG. 7b is a conceptual illustration of the internal configuration entities that define separate MOM server instances, according to an embodiment of the invention.
Figure 8:
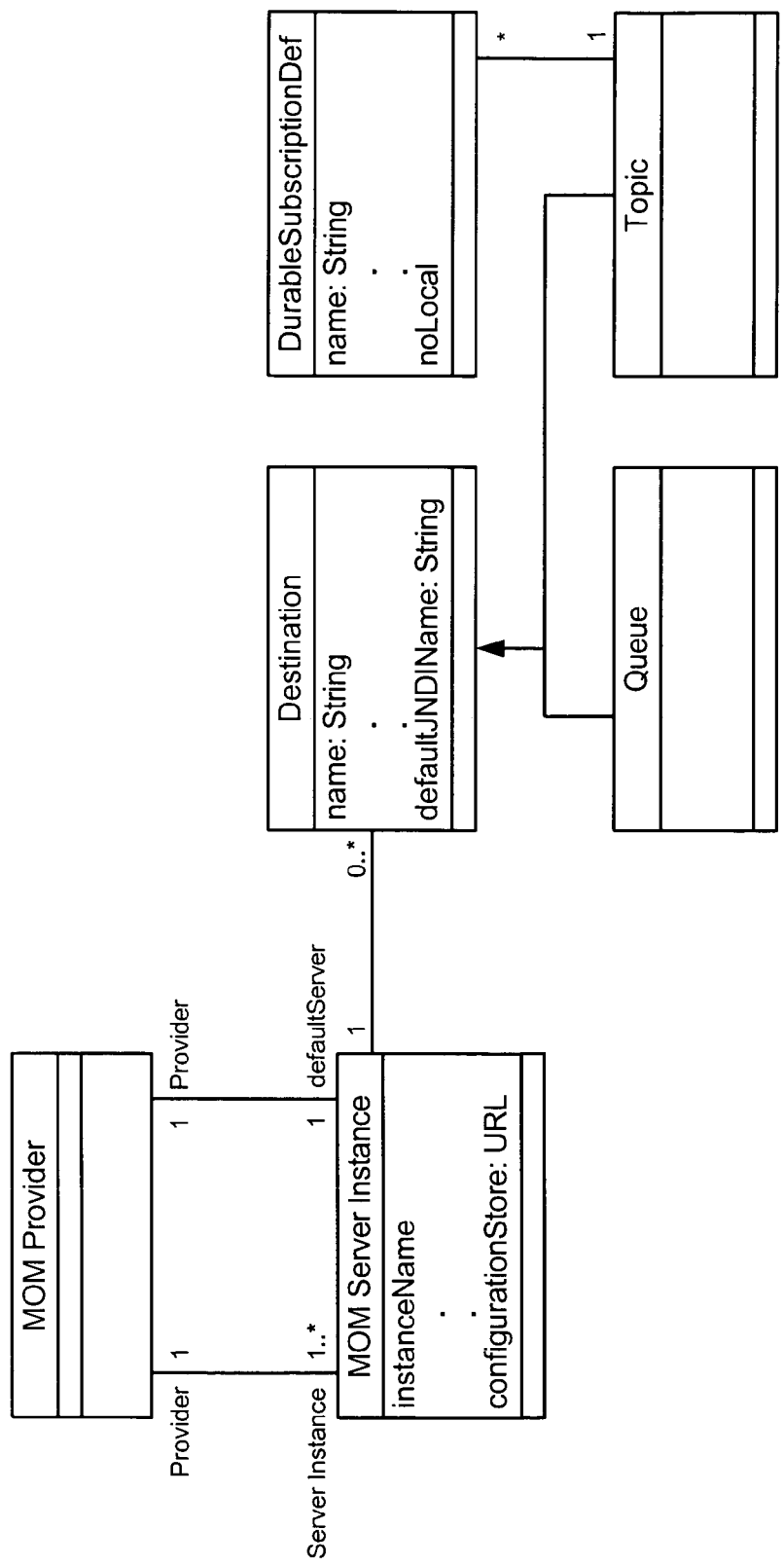
FIG. 8 is a Unified Modeling Language (UML) diagram illustrating a data model according to an embodiment of the invention.

In an embodiment, internal configuration entities may be used to define JMS server instances that are separately instantiated on distinct nodes. FIG. 7a is a conceptual illustration of the administered objects stored in JNDI namespace 700. FIG. 7b is a conceptual illustration of the internal configuration entities that define separate JMS server instances, according to an embodiment of the invention.

FIG. 7a is a conceptual illustration of selected elements of the JNDI namespace of a node, according to an embodiment of the invention. One or more administered objects may be bound to JNDI proxy base 702 via, for example, a connector service. JMS connection factory 704 may specify the settings and driver libraries that are used to connect to a JMS service (e.g., JMS provider 712, shown in FIG. 7b). Enhanced connection factory 706 is a special type of connection factory that allows for settings to be specified that support multiple JMS server instances (e.g., supports the configuration of the entities shown in FIG. 7b). Destination administered object 708 may specify the settings for a destination (e.g., for a queue and/or a topic). Enhanced destination object 710 is a special type of destination object that supports settings such as those discussed below with reference to FIG. 10.

FIG. 7b is a conceptual illustration of selected configuration entities 711, according to an embodiment of the invention. Each configuration entity may include one or more items of configuration information (e.g., an MOM server instance identifier). An MOM provider (e.g., MOM provider 300, shown in FIG. 3) may use this configuration information to determine how to handle (e.g., where to send) incoming and outgoing messages. In addition, the configuration information may specify the use of system resources such as memory.

MOM provider 712 is the central configuration entity for an MOM provider (e.g., MOM provider 300, shown in FIG. 3). In an embodiment, the configuration information (or, for ease of discussion, "properties") stored for MOM provider 712 are valid for all MOM server instances of the MOM provider. Typically these values are system-specific (e.g., network port number) and are, therefore established during installation of an enterprise network. In an embodiment, the MOM server instances share these network layer properties.

In an embodiment, an administrative tool (e.g., administrative tool 614, shown in FIG. 6) may be used to modify the configuration information. In one embodiment, a default MOM server instance is initially instantiated during, for example, installation of the MOM provider. As is further described below, additional MOM server instances may be separately configured on, for example, each server node via, for example, an administrative tool.

As described above, embodiments of the invention provide an MOM provider having multiple MOM server instances. In an embodiment, MOM server instance entity 714 provides a mechanism for defining the multiple MOM server instances. Each MOM server instance may manage a distinct set of destinations. Thus, a particular queue or topic is typically deployed to one MOM server instance.

In an embodiment, all MOM server instances share one common network layer and, therefore, use the same port. For example, all MOM server instances may share the common network layer defined in MOM provider entity 712. In such an embodiment, an MOM server instance is unambiguously identified by the combination of a hostname, port, and MOM server instance name (e.g., server instance name 716 also referred to as a server instance identifier).

In an embodiment, one or more properties may be configured for each MOM server instance. For example, each MOM server instance may have an instanceName (or other identifier) to distinguish one server instance from another. In an embodiment, each instanceName is unique for a given application server installation. In one embodiment, all application servers and all MOM server instances share a common configuration store. In such an embodiment, a configuration store property (e.g., a Uniform Resource Locator (URL)) may be configured for each MOM server instance. A configuration repository (e.g., configuration repository 612, shown in FIG. 6) may access the configuration store using the specified URL (or other specified configuration store property).

In an embodiment, one or more properties may be specified for a destination. Destination entity 718 represents the configurable properties of a destination according to an embodiment of the invention. Typically, queues and topics have a number of common properties which are, hereinafter, referred to as "standard destination properties." In one embodiment, the standard destination properties include: a name and a defaultJNDIName. The "name" may provide a unique internal (e.g., within an application server) identifier for a destination. The "defaultJNDIName" may specify the default name for a destination in a JNDI directory. In one embodiment, the MOM provider automatically creates an administered object in JNDI when a destination having a defaultJNDIName is deployed to the MOM provider. In alternative embodiments, destination entity 718 may have more properties, fewer properties, and/or different properties.

In an embodiment, a client may have a durable subscription to a topic. Durable subscription entity 720 illustrates the configurable properties of a durable subscription. Durable subscription entity 720 may be created during runtime and/or may be "pre-defined" during design time. If durable subscription entity 720 has been pre-defined during design time, a client may call the following method to create a durable subscription: "createDurableSubscriber(topic, subscriptionName)." In response, the MOM provider (e.g., MOM provider 300, shown in FIG. 3) may automatically apply one or more predefined properties to the durable subscription. Alternatively, the properties for a durable subscription may be individually set during runtime.

In one embodiment, the configurable properties of durable subscription entity 720 include a name property and a NoLocal property. The name property may provide an identifier for the durable subscription. The NoLocal property may provide a mechanism for clients to ensure that they are not the recipients of messages that they publish. In alternative embodiments, durable subscription entity 720 may have more properties, fewer properties, and/or different properties.

Figure 9A:
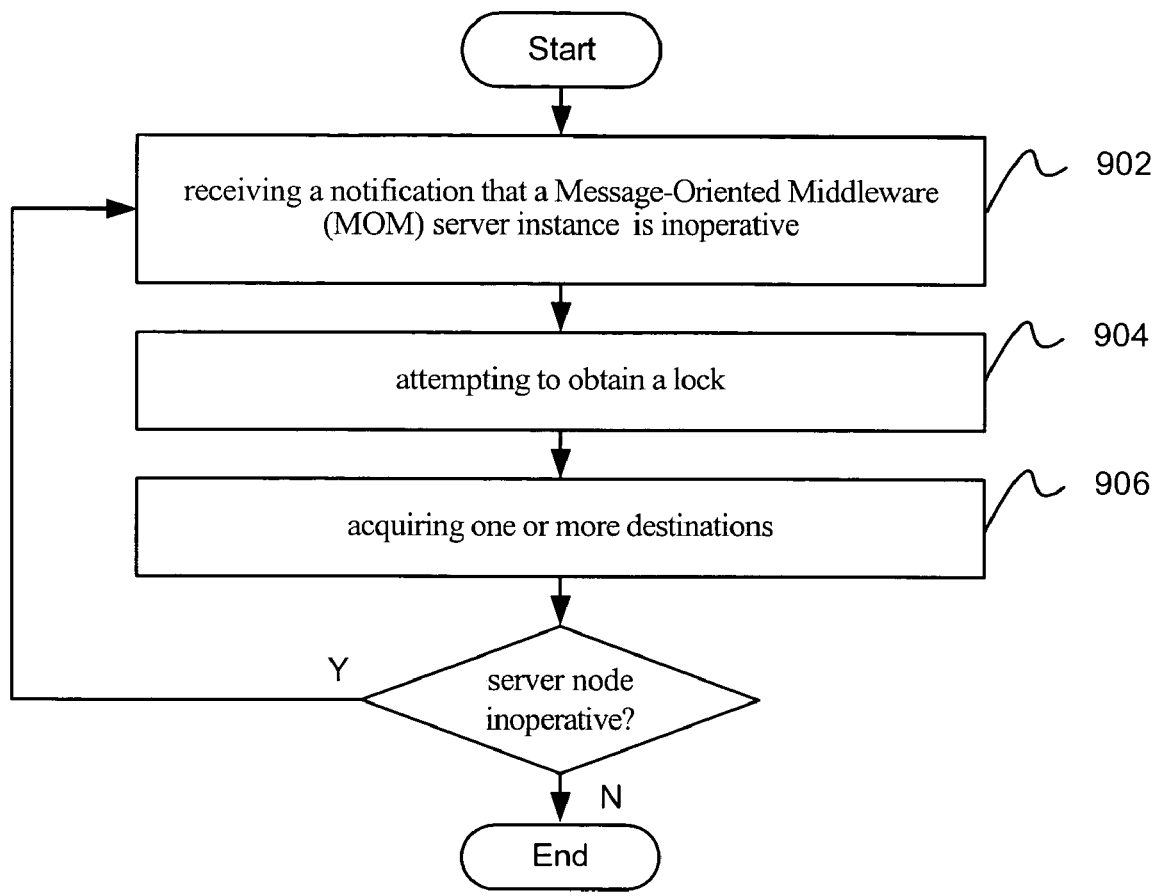
FIG. 9a is a flow diagram illustrating selected aspects of a method for failover in an MOM provider having multiple server instances, according to an embodiment of the invention.
Figure 9B:
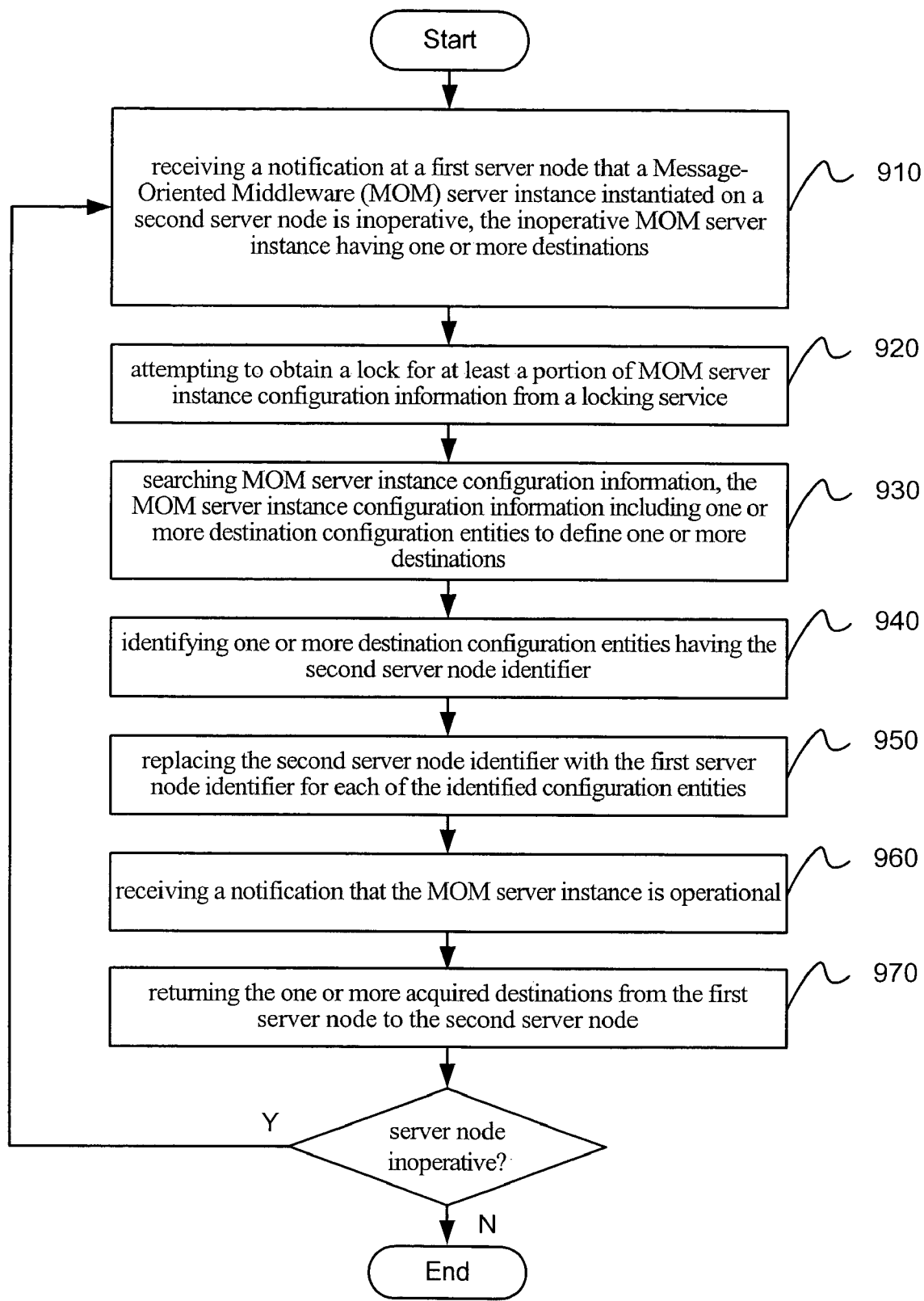
FIG. 9b is a flow diagram illustrating certain aspects of a method for failover in an MOM provider having multiple server instances, according to an embodiment of the invention.

Turning now to FIGS. 9a-9b, the particular methods associated with embodiments of the invention are described in terms of computer software and hardware with reference to a flowchart. The methods to be performed by an MOM provider having multiple MOM server instances may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 9a is a flow diagram illustrating selected aspects of a method for failover in an MOM provider having multiple server instances, according to an embodiment of the invention. Referring to process block 902, a first server node receives notification that an MOM server instance residing on a second node is inoperative. The MOM server instance may be defined, at least in part, by MOM server instance configuration information (e.g., MOM server instance 714, shown in FIG. 7b). Referring to process block 904, the first server node may attempt to obtain a lock for at least a portion of the MOM server instance configuration information from, for example, a locking service. If the lock is obtained, the first server node my acquire the one or more destinations of the inoperative MOM server instance as shown by reference numeral 906.

FIG. 9b is a flow diagram illustrating certain aspects of a method for failover in an MOM provider having multiple server instances, according to an embodiment of the invention. Referring to process block 910, a first MOM server node receives notification that an MOM server instance on a second server node is inoperative. The term "server node" broadly refers to, for example, an application server, a dispatcher, and/or a debug node. The received notification may be sent by the second node and/or by a central service of a cluster of server nodes (e.g., central services 1100 shown in FIG. 11). The central service may periodically ping each MOM service instance to determine whether it is operational and/or a server node may automatically generate a "notification" if its MOM server instance becomes inoperative. The term "inoperative" broadly refers to partial and/or complete failure of an MOM server instance (and/or its associated server node). In addition, the term "inoperative" may include a temporary stoppage of the MOM server instance. For example, the first server node may receive a "serviceStopped( )" event notification from the central service. In an embodiment, the received notification includes a server node identifier that identifies the second server node.

As discussed above, each MOM server instance may be associated with one or more configuration entities. For example, each destination belonging to an MOM server instance may be defined, at least in part, by a destination configuration entity (e.g., destination configuration entity 718, shown in FIG. 7*b*). The various configuration entities may be collectively referred to as "MOM server instance configuration information." Referring to process block 920, the first server node attempts to obtain a lock for at least a portion of MOM server instance configuration information from a locking service. The term "lock" refers to a logical lock of information stored in a persistent store (e.g., a database). A "locking service" (e.g., locking service 1102, shown in FIG. 11) refers to a service that provides locks and tracks the locks that are distributed within a network. The MOM server instance configuration information may be stored in, a database (e.g., database 320, shown in FIG. 3), a configuration repository (e.g., configuration repository 612, shown in FIG. 6), and/or a distribution directory (e.g., distribution directory 622, show in FIG. 6). In addition, the MOM server instance configuration information may be distributed across more than one store.

In one embodiment, the notification that the MOM server instance is inoperative is sent to all server nodes within the cluster, with the possible exception of the server node that is hosting the inoperative MOM server instance. In such an embodiment, each server node that receives the notification may attempt to acquire the lock. One of the server nodes may obtain the lock. In an embodiment, the server nodes that do not obtain the lock exit the failover process.

In an embodiment, if the first server node obtains the lock, then it proceeds to acquire the destinations of the inoperative MOM server instance. In one embodiment, acquiring these destinations includes locating the destination configuration entities corresponding to the destinations and altering, at least in part, the configuration information stored therein. Referring to process block 930, the first server node searches MOM server instance configuration.information to locate the destinations belonging to the inoperative server instance. The term "searching" broadly refers to scanning a store (e.g., a database) to locate information.

In one embodiment, each destination configuration entity includes a server node identifier that specifies the server node on which the destination is implemented. Referring to process block 940, one or more destination configuration entities having the second server node identifier are located. In an embodiment, the first server node acquires the destinations of the inoperative MOM server instance by altering the identified configuration entities (e.g., via a write operation) so that they contain the first server node identifier. Referring to process block 950, the second server node identifier in each identified destination configuration entity is replaced with the first server node identifier.

In one embodiment, each destination retains both the first server node identifier and the second server node identifier so that a history of "ownership" of the destination is maintained. For example, the first server node identifier may be added to a list of node identifiers or placed in a different field. Retaining both identifiers may be desirable so that the destinations may be returned to the second server node if the inoperative MOM server instance is returned to operation.

Referring to process block 960, the first server node receives a notification that the MOM server instance is operational. The notification may be received from the central service and/or the second sever node. In one embodiment, the first server node receives a "serviceStarted( )" event that indicates the MOM server instance has returned to operation. The serviceStarted( ) event may include the second server node identifier to specify that it is the MOM server instance on the second server node that has started.

Referring to process block 970, the one or more acquired destinations are returned to the second server node. In one embodiment, the process of returning the destinations is substantially similar to the process of acquiring the destinations. For example, either the first or second server node may obtain a lock from the locking service and search a configuration store for destinations having the first server node identifier. Once the destinations are identified, the first server node identifier may be replaced with the second server node identifier. In an alternative embodiment, the node acquiring the lock may search for destinations that were previously owned by the second server node and are currently owned by the first server node. In such an embodiment, each destination configuration entity may maintain a node identifier for both the current owner and the previous owner.

Figure 10:
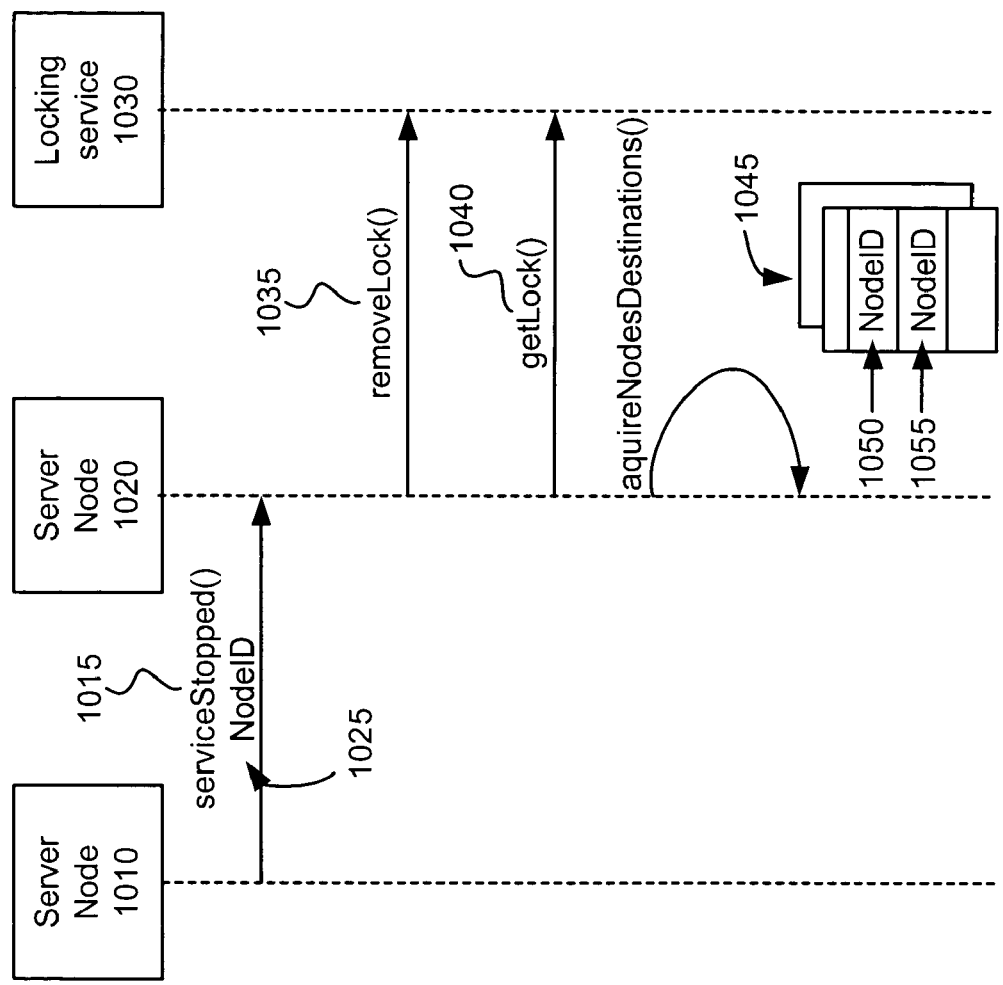
FIG. 10 is a transaction diagram illustrating selected aspects of the MOM server instance failover process, according to an embodiment of the invention.

FIG. 10 is a transaction diagram illustrating selected aspects of the MOM server instance failover process, according to an embodiment of the invention. Server node 1010 transmits serviceStopped( ) event 1015 to server node 1020. In an embodiment, serviceStopped( ) event 1015 provides notification that an MOM server instance instantiated on server node 1010 is inoperative. In the illustrated embodiment, serviceStopped( ) event 1015 includes node identifier 1025 to specify that server node 1010 is the owner of the inoperative MOM server instance.

In one embodiment, server node 1010 holds a lock from locking service 1030. Server node 1020 may transmit removeLock( ) event 1035 to remove the lock held by server node 1010. Server node 1020 may also transmit getLock( ) event 1040 to obtain a lock from locking service 1030. In one embodiment, all server nodes receiving serviceStopped( ) event 1015 attempt to obtain a lock from locking service 1030.

In the illustrated embodiment, server node 1020 successfully obtains the lock from locking service 1030. After acquiring the lock, sever node 1020 may then acquire destinations 1045 from the inoperative MOM server instance. As described above, acquiring the destinations may involve searching a configuration store to identify destinations having server node identifier 1025. In the illustrated embodiment, server node 1020 writes node identifier 1050 to destinations 1045. Reference numeral 1055 indicates that destinations 1045 may also include a node identifier that specifies a previous owner (e.g., node identifier 1025).

In one embodiment, the MOM provider having multiple server instances is implemented within a cluster of server nodes. An exemplary application server architecture will now be described. It is to be understood that, in alternative embodiments of the invention, the application servers may have a different architecture.

An application server architecture employed in one embodiment of the invention is illustrated in FIG. 11. The architecture includes central services "instance" 1100 and a plurality of application server "instances" 1110, 1120. As used herein, application server instances, 1110 and 1120, each include a group of server nodes 1114, 1116, 1118 and 1124, 1126, 1128, respectively, and a dispatcher, 1112, 1122, respectively. Central services instance 1100 includes locking service 1102 and messaging service 1104 (described below). The combination of all of the application instances 1110, 1120 and central services instance 1100 is referred to herein as a "cluster." Although the following description will focus solely on instance 1110 for the purpose of explanation, the same principles apply to other instances such as instance 1120.

Server nodes 1114, 1116, 1118 within instance 1110 provide the business and/or presentation logic for the network applications supported by the system. Each of the server nodes 1114, 1116, 1118 within a particular instance 1110 may be configured with a redundant set of application logic and associated data. In one embodiment, dispatcher 1112 distributes service requests from clients to one or more of server nodes 1114, 1116, 1118 based on the load on each of the servers. For example, in one embodiment, a dispatcher implements a round-robin policy of distributing service requests (although various alternate load balancing techniques may be employed).

In one embodiment of the invention, server nodes 1114, 1116, 1118 are Java 2 Platform, Enterprise Edition ("J2EE") server nodes which support Enterprise Java Bean ("EJB") components and EJB containers (at the business layer) and Servlets and Java Server Pages ("JSP") (at the presentation layer). Of course, certain aspects of the invention described herein may be implemented in the context of other software platforms including, by way of example, Microsoft NET platforms and/or the Advanced Business Application Programming ("ABAP") platforms developed by SAP AG, the assignee of the present application.

In one embodiment, communication and synchronization between each of instances 1110 and 1120 is enabled via central services instance 1100. As illustrated in FIG. 11, central services instance 1100 includes messaging service 1104 and locking service 1102. Message service 1104 allows each of the servers within each of the instances to communicate with one another via a message passing protocol. For example, messages from one server may be broadcast to all other servers within the cluster via messaging service 1104. In addition, messages may be addressed directly to specific servers within the cluster (e.g., rather than being broadcast to all servers).

In one embodiment, locking service 1102 disables access to (i.e., locks) certain specified portions of configuration data and/or program code stored within a central database 1130. Locking managers 1140 and 1150 employed within the server nodes lock data on behalf of various system components which need to synchronize access to specific types of data and program code (e.g., such as the configuration managers 1144 and 1154). As described in detail below, in one embodiment, locking service 1102 enables a distributed caching architecture for caching copies of server/dispatcher configuration data.

In one embodiment, messaging service 1104 and locking service 1102 are each implemented on dedicated servers. However, messaging service 1104 and the locking service 1102 may be implemented on a single server or across multiple servers while still complying with the underlying principles of the invention.

As illustrated in FIG. 11, each server node (e.g., 1118, 1128) includes a lock manager 1140, 1150 for communicating with locking service 1102; a cluster manager 1142, 1152 for communicating with messaging service 1104; and a configuration manager 1144, 1154 for communicating with central database 1130 (e.g., to store/retrieve configuration data). Although lock managers 1140 and 1150, cluster managers 1142 and 1152, and configuration managers 1144 and 1154 are illustrated with respect to particular server nodes, 1118 and 1128, in FIG. 11, each of the server nodes 1114, 1116, 1124 and 1126 and/or on the dispatchers 1112, 1122 may be equipped with equivalent lock managers, cluster managers and configuration managers.

In an embodiment, MOM provider 1160 provides a scalable MOM architecture for the cluster. MOM provider 1160 may provide configuration facilities (e.g., MOM configuration services 610, shown in FIG. 6) to configure logical MOM server instances 1143 and 1153. The distributed nature of the MOM service allows for separation of destination namespace, load balancing, and other advantages. Although MOM server instances 1143 and 1153 are illustrated with respect to server nodes 1118 and 1128, it is possible to similarly configure an MOM server instance on server nodes 1114, 1116, 1124 and 1126 and/or on the dispatchers 1112, 1122, in an embodiment of the invention.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method employed within a network comprising:
receiving a notification at a first server node that a Java Message Service (JMS)-based server instance on a second server node is inoperative, the inoperative JMS-based server instance having one or more destinations, wherein at least one of the first server node and the second server node is a Java 2 Enterprise Edition-based application server; and, in response to receiving the notification, obtaining a lock for at least a portion of JMS-based server instance configuration information from a locking service, wherein the portion of JMS-based server instance configuration information includes the one or more destinations; and, subsequently, acquiring the one or more destinations of the inoperative JMS-based server instance at the first server node, wherein the acquiring comprises acquiring at least one of a queue of the inoperative JMS-based server instance and a topic of the inoperative JMS-based server instance.

2. The method of claim 1, wherein the first server node is identified by a first server node identifier, the received notification includes the first server node identifier, and the second server node is identified by a second server node identifier.

3. The method of claim 2, wherein acquiring the one or more destinations of the inoperative JMS-based server instance at the first server node further comprises:
searching the JMS-based server instance configuration information, the JMS-based server instance configuration information including one or more destination configuration entities to define one or more destinations;

identifying one or more destination configuration entities having the second server node identifier; and replacing the second server node identifier with the first server node identifier for each of the identified configuration entities.

4. The method of claim 1, further comprising:

receiving a notification that the JMS-based server instance is operational; and returning the one or more acquired destinations from the first server node to the second server node.

5. The method of claim 1, wherein receiving the notification at a first server node that the JMS-based server instance on the second server node is inoperative comprises:

receiving the notification from a central service of a cluster of application servers that the JMS-based server instance on the second server node is inoperative.

6. The method of claim 1, wherein receiving the notification at a first server node that the JMS-based server instance on the second server node is inoperative comprises:

receiving the notification from the second server node that the JMS-based server instance is inoperative.

7. A system comprising:

a plurality of server nodes communicatively coupled on an enterprise network, the plurality of server nodes to serve applications over the enterprise network to a plurality of clients; and a Java Message Service (JMS)-based Message-Oriented Middleware (MOM) provider to provide a message service for the plurality of server nodes, the JMS-based MOM provider including a first JMS-based server instance having one or more associated destinations implemented on a first server node and a second JMS-based server instance implemented on a second server node, wherein at least one of the first server node and the second server node is a Java 2 Enterprise Edition based server node wherein the second JMS-based server instance is to acquire the one or more destinations only upon the first JMS-based server instance becoming inoperative, and wherein the second JMS-based server instance is for acquiring at least one of a queue of an inoperative JMS-based server instance and a topic of an inoperative JMS-based server instance.

8. The system of claim 7, further comprising:

a configuration store having a destination configuration entity for each of the one or more destinations, each destination configuration entity including a server node identifier to identify an associated server node.

9. An article of manufacture comprising:

an electronically accessible medium providing instructions that, when executed by an apparatus, cause the apparatus to:

receive a notification at a first server node that a Java Message Service (JMS)-based server instance on a second server node is inoperative, the inoperative JMS-based server instance having one or more destinations, wherein at least one of the first server node and the second server node is a Java 2 Enterprise Edition-based application server; and, in response to receiving the notification, obtain a lock for at least a portion of JMS-based server instance configuration information from a locking service, wherein the portion of JMS-based server instance configuration information includes the one or more destinations; and, subsequently, acquire the one or more destinations of the inoperative JMS-based server instance at the first server node subsequent to obtaining the lock, wherein the acquiring comprises acquiring at least one of a queue of the inoperative JMS-based server instance and a topic of the inoperative JMS-based server instance.

10. The article of manufacture of claim 9, wherein the first server node is identified by a first server node identifier, the received notification includes the first server node identifier, and the second server node is identified by a second server node identifier.

11. The article of manufacture of claim 10, wherein the instructions that, when executed by the apparatus, cause the apparatus to acquire the one or more destinations of the inoperative JMS-based server instance at the first server node, comprise instructions that cause the apparatus to:

search the JMS-based server instance configuration information, the JMS-based server instance configuration information including one or more destination configuration entities to define one or more destinations;

identify one or more destination configuration entities having the second server node identifier; and replace the second server node identifier with the first server node identifier for each of the identified configuration entities.

12. The article of manufacture of claim 9, wherein the electronically accessible medium provides further instructions that, when executed by the apparatus, cause the apparatus to:

receive a notification that the JMS-based server instance is operational; and return the one or more acquired destinations from the first server node to the second server node.

13. The article of manufacture of claim 9, wherein the instructions that, when executed by the apparatus, cause the apparatus to receive the notification at the first server node that a JMS-based server instance on the second server node is inoperative cause the apparatus to:

receive the notification from a central service of a cluster of application servers that the JMS-based server instance on the second server node is inoperative.

14. The article of manufacture of claim 9, wherein the instructions that, when executed by the apparatus, cause the apparatus to receive the notification from the central service of the cluster of application servers that the JMS-based server instance on the second server node is inoperative, comprise instructions that cause the apparatus to:

receive the notification from the central service of the cluster of application servers that the JMS-based server instance on the second server node is inoperative.

* * * * *